United States Patent
Anami

(10) Patent No.: US 11,267,665 B2
(45) Date of Patent: Mar. 8, 2022

(54) MEDIUM FEED DEVICE AND IMAGE READING APPARATUS

(71) Applicant: SEIKO EPSON CORPORATION, Tokyo (JP)

(72) Inventor: Akira Anami, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 172 days.

(21) Appl. No.: 16/394,732

(22) Filed: Apr. 25, 2019

(65) Prior Publication Data

US 2019/0329996 A1 Oct. 31, 2019

(30) Foreign Application Priority Data

Apr. 27, 2018 (JP) .............................. JP2018-086430

(51) Int. Cl.
*B65H 1/04* (2006.01)
*H04N 1/12* (2006.01)

(52) U.S. Cl.
CPC ............... *B65H 1/04* (2013.01); *H04N 1/121* (2013.01); *B65H 2404/721* (2013.01);
(Continued)

(58) Field of Classification Search
CPC ...... B65H 1/04; B65H 1/266; B65H 2511/12; B65H 2511/10; B65H 3/54;
(Continued)

(56) References Cited

U.S. PATENT DOCUMENTS

| 5,377,966 A * | 1/1995 | Ohmori | ................. B65H 31/20 271/223 |
| 9,860,406 B2 | 1/2018 | Nagai | |

(Continued)

FOREIGN PATENT DOCUMENTS

| CN | 106470286 | 3/2017 |
| JP | S54-88787 | 6/1979 |

(Continued)

OTHER PUBLICATIONS

Stanislas Gutev Information Extraction from Images of Shopping Receipts:, Master Thesis, Dec. 31, 2011, pp. 1-53.

(Continued)

*Primary Examiner* — Luis A Gonzalez
(74) *Attorney, Agent, or Firm* — Workman Nydegger

(57) ABSTRACT

A medium feed device includes edge guides provided at a medium placement part including a placement surface on which a medium is placed and including guide surfaces that guide edges in a direction intersecting with a feed direction of the medium; and a restriction part configured to take a position between the edge guides such that a position of the restriction part in a direction normal to the placement surface is a position at which the restriction part suppresses a lift of the medium from the placement surface and a position at which the restriction part suppresses separation of the edges of the medium from the guide surfaces. The position of the restriction part at which the restriction part suppresses the lift is located on a placement surface side with respect to an intermediate position between upper ends of the guide surfaces and the placement surface.

7 Claims, 12 Drawing Sheets

(52) U.S. Cl.
CPC ............... *B65H 2405/114* (2013.01); *B65H 2405/1142* (2013.01); *B65H 2405/11151* (2013.01); *B65H 2511/12* (2013.01)

(58) Field of Classification Search
CPC .. B65H 2405/1142; B65H 2405/11152; B65H 2404/721; B65H 2404/114; B65H 2405/11151; H04N 1/00615
See application file for complete search history.

(56) References Cited

U.S. PATENT DOCUMENTS

| | | |
|---|---|---|
| 2009/0322010 A1 | 12/2009 | Kusama |
| 2014/0064618 A1 | 3/2014 | Jannsen, Jr. |
| 2017/0054864 A1 | 2/2017 | Nagai |

FOREIGN PATENT DOCUMENTS

| | | | |
|---|---|---|---|
| JP | 11240637 A | * | 9/1999 |
| JP | 2001328752 A | * | 11/2001 |
| JP | 2002-255357 A | | 9/2002 |
| JP | 2003-182860 | | 7/2003 |
| JP | 2004083246 A | * | 3/2004 |
| JP | 2008133114 A | * | 6/2008 |
| JP | 2011157215 A | * | 8/2011 |
| JP | 2017-165575 A | | 9/2017 |

OTHER PUBLICATIONS

European Search Report issued in Application No. EP19171063 dated Sep. 12, 2019.

* cited by examiner

MEDIUM FEED DEVICE AND IMAGE READING APPARATUS

The present application is based on, and claims priority from JP Application Serial Number 2018-086430, filed Apr. 27, 2018, the disclosure of which is hereby incorporated by reference herein in its entirety.

BACKGROUND

1. Technical Field

The present disclosure relates to a medium feed device and an image reading apparatus that reads an image on a medium that is fed by the medium feed device.

2. Related Art

A scanner serving as an example of an image reading apparatus may be provided with an automatic feed device for a medium serving as a document (also referred to as auto document feeder (ADF)) as a medium feed device, to automatically feed a plurality of media and read the media.

In addition, there is such a medium feed device in which edge guides that are provided at a medium tray on which a medium is placed and that guide edges in a width direction of the medium are slidable in the width direction in accordance with the medium size.

In the medium feed device, skew that is a phenomenon in which a medium is fed in an obliquely tilted state may occur.

To suppress skew during feed of a medium, JP-A-2017-165575 and JP-A-2002-255357 disclose that upper restriction parts (upper guides 22 and 32 in JP-A-2017-165575, upper guide parts 12 in JP-A-2002-255357) that restrict upward movement of end portions in the width direction of the medium are provided at the edge guides.

In JP-A-2017-165575 and JP-A-2002-255357, the upper restriction parts are provided at upper ends of guide surfaces of the edge guides (inner side surfaces 211 and 311 in JP-A-2017-165575, width guide parts 11 in JP-A-2002-255357). That is, a certain distance is provided between a placement surface of the medium tray and the upper restriction parts.

With a scanner, there may be user's request to read, for example, a narrow and long medium, such as a register tape printed by a register.

In a case of a wide medium, even when an end portion in the width direction of the medium moves from the placement surface of the medium tray to the upper restriction part, the moving distance is small relative to the medium width, and hence the movement less likely appears as large skew of the medium. However, in a case of a narrow medium, when an end portion in the width direction of the medium moves from the placement surface of the medium tray to the upper restriction part, the moving distance is large relative to the medium width, and hence the movement appears as large skew of the medium. In particular, in a case of a narrow and long medium, skew based on the movement amount of the end portion in the width direction of the medium to the upper restriction part is accumulated as the medium is fed, and the medium may be largely twisted.

SUMMARY

An object of the present disclosure is to provide a medium feed device capable of appropriately feeding a medium whose skew likely noticeably appears, and an image reading apparatus including the medium feed device.

According to an aspect of the present disclosure, a medium feed device includes a medium placement part including a placement surface configured to have placed thereon a medium to be fed; a pair of a first edge guide and a second edge guide that are provided at the medium placement part and that include guide surfaces that guide edges in a width direction of the medium, the width direction intersecting with a feed direction of the medium; and a restriction part configured to be switched between a first state and a second state. In the first state, the restriction part extends in the width direction between the first edge guide and the second edge guide, a position of the restriction part in a direction normal to the placement surface is on a placement surface side with respect to an intermediate position between upper ends of the guide surfaces and the placement surface, and the restriction part suppresses a lift of the medium from the placement surface. In the second state, the restriction part is retracted from between the first edge guide and the second edge guide.

With the aspect, the medium feed device includes the restriction part configured to be switched between the first state and the second state. In the first state, the restriction part extends in the width direction between the first edge guide and the second edge guide, the position of the restriction part in the direction normal to the placement surface is on the placement surface side with respect to the intermediate position between the upper ends of the guide surfaces and the placement surface, and the restriction part suppresses the lift of the medium from the placement surface. In the second state, the restriction part is retracted from between the first edge guide and the second edge guide. Accordingly, by bringing the restriction part into the first state, occurrence of skew at the medium can be suppressed as compared with the case where the restriction part is in the second state.

For example, when a medium that is less likely skewed is to be fed, by bringing the restriction part into the second state, the maximum stack number of media on the medium placement part can be larger than the case where the restriction part is in the first state.

According to another aspect of the present disclosure, a medium feed device includes a medium placement part including a placement surface configured to have placed thereon a medium to be fed; a pair of a first edge guide and a second edge guide that are provided at the medium placement part and that include guide surfaces that guide edges in a width direction of the medium, the width direction intersecting with a feed direction of the medium; and a restriction part configured to be switched between a first state and a second state. In the first state, the restriction part extends in the width direction between the first edge guide and the second edge guide, a position of the restriction part in a direction normal to the placement surface is a position at which the restriction part suppresses a lift of the medium from the placement surface and a position at which the restriction part suppresses separation of the edges of the medium from the guide surfaces. In the second state, the restriction part is retracted from between the first edge guide and the second edge guide.

With the aspect, the medium feed device includes the restriction part configured to be switched between the first state and the second state. In the first state, the restriction part extends in the width direction between the first edge guide and the second edge guide, the position of the restriction part in the direction normal to the placement surface is the position at which the restriction part suppresses the lift of the medium from the placement surface and the position at which the restriction part suppresses the separation of the edges of the medium from the guide surfaces. In the second state, the restriction part is retracted from between the first edge guide and the second edge guide. Accordingly, by bringing the restriction part into the first state, occurrence of skew at the medium can be suppressed as compared with the case where the restriction part is in the second state.

For example, when a medium that is less likely skewed is to be fed, by bringing the restriction part into the second state, the maximum stack number of media on the medium placement part can be larger than the case where the restriction part is in the first state.

In the medium feed device according to the present disclosure, the restriction part may be located at a position close to the placement surface in the direction normal to the placement surface.

In this specification, "a position close to the placement surface" represents a position at a certain distance (for example, 2 to 3 mm) that one to several media can be placed between the restriction part and the placement surface.

In this case, since the restriction part may be located at the position close to the placement surface in the direction normal to the placement surface in the first state, when the restriction part is in the first state, occurrence of skew at the medium can be further effectively suppressed.

According to still another aspect of the present disclosure, a medium feed device includes a medium placement part including a placement surface configured to have placed thereon a medium to be fed; a pair of a first edge guide and a second edge guide that are provided at the medium placement part and that include guide surfaces that guide edges in a width direction of the medium, the width direction intersecting with a feed direction of the medium; and a restriction part configured to be switched between a first state and a second state. In the first state, the restriction part presses the medium to the placement surface between the first edge guide and the second edge guide. In the second state, the restriction part is separated from the medium on the placement surface. The restriction part restricts a lift of the medium from the placement surface in the first state.

With the aspect, the medium feed device includes the restriction part configured to be switched between the first state and the second state. In the first state, the restriction part presses the medium to the placement surface between the first edge guide and the second edge guide. In the second state, the restriction part is separated from the medium on the placement surface. The restriction part restricts the lift of the medium from the placement surface in the first state. Accordingly, by bringing the restriction part into the first state, occurrence of skew at the medium can be suppressed as compared with the case where the restriction part is in the second state.

For example, when a medium that is less likely skewed is to be fed, by bringing the restriction part into the second state, the maximum stack number of media on the medium placement part can be larger than the case where the restriction part is in the first state.

In the medium feed device according to the present disclosure, the restriction part may include a rotary body that is provided at a contact potion of the restriction part with respect to the medium and that rotates in the feed direction.

In this case, since the restriction part may include the rotary body that is provided at the contact potion of the restriction part with respect to the medium and that rotates in the feed direction, transport resistance that is generated when the restriction part presses the medium can be reduced.

In the medium feed device according to the present disclosure, the restriction part may suppress a lift of at least a center region in the width direction of the medium from the placement surface when the restriction part is switched to the first state.

In this case, since the restriction part may suppress the lift of at least the center region in the width direction of the medium from the placement surface when the restriction part is switched to the first state, a lift of the medium from the placement surface can be effectively suppressed.

In the medium feed device according to the present disclosure, the restriction part may be switched between the first state and the second state when the restriction part pivots on, as an axis, a pivot shaft provided at the first edge guide.

In this case, since the restriction part may be switched between the first state and the second state when the restriction part pivots on, as the axis, the pivot shaft provided at the first edge guide, the configuration that switches the state of the restriction part between the first state and the second state can be easily provided.

In the medium feed device according to the present disclosure, a free-end side of the restriction part may reach the second edge guide when the restriction part is switched to the first state.

In this case, since the free-end side of the restriction part may reach the second edge guide when the restriction part is switched to the first state, the restriction part presses the medium entirely in the width direction, and the medium can be more reliably prevented from being skewed.

In the medium feed device according to the present disclosure, the second edge guide may include a receiving portion that receives the free-end side of the restriction part, and the restriction part may include a positioning portion that sets a distance between the second edge guide and the first edge guide to a predetermined distance when the free-end side is received by the receiving portion.

In this case, since the second edge guide may include the receiving portion that receives the free-end side of the restriction part, and the restriction part may include the positioning portion that sets the distance between the second edge guide and the first edge guide to the predetermined distance when the free-end side is received by the receiving portion, the distance between the second edge guide and the first edge guide can be set to the predetermined distance.

In the medium feed device according to the present disclosure, the restriction part may be housed in a housing portion provided in the first edge guide when the restriction part is switched to the second state.

In this case, since the restriction part may be housed in the housing portion provided in the first edge guide when the restriction part is switched to the second state, in a case where the restriction part is not required to press the medium, the restriction part can be housed in the housing portion.

In the medium feed device according to the present disclosure, the restriction part may be switched between the first state and the second state when the restriction part pivots on, as an axis, a pivot shaft provided in a casing having arranged therein a feed unit that feeds the medium.

In this case, since the restriction part may be switched between the first state and the second state when the restriction part pivots on, as the axis, the pivot shaft provided in the casing having arranged therein the feed unit that feeds the medium, the configuration that switches the state of the restriction part between the first state and the second state can be easily provided.

According to yet another aspect of the present disclosure, an image reading apparatus includes a reading unit that reads an image on the medium; and the medium feed device according to any one of the above-described aspects that feeds the medium toward the reading unit.

With the aspect, the image reading apparatus including the reading unit that reads the image on the medium; and the medium feed device that feeds the medium toward the reading unit can attain advantageous effects similar to those of the above-described aspects.

DESCRIPTION OF EXEMPLARY EMBODIMENTS

First Embodiment

An image reading apparatus according to an embodiment of the present disclosure is briefly described first. A document scanner 1 (hereinafter, merely referred to as scanner 1) configured to read at least one surface of a front surface and a back surface of a medium is described as an example of the image reading apparatus in this embodiment.

Regarding the X-Y-Z coordinate system in each drawing, the X direction is an apparatus width direction and a medium width direction, and the Y direction is a medium transport direction. The Z direction is a direction intersecting with the Y direction, and indicates a direction substantially orthogonal to a plane of a medium to be transported. It is assumed that the +Y side is an apparatus front-surface side, and the −Y side is an apparatus rear-surface side. It is assumed that the left side when viewed from the apparatus front-surface side is the +X side, and the right side is the −X side. The +Z side is an apparatus upper side (including an upper section, an upper surface, and so forth), and the −Z side is an apparatus lower side (including a lower section, a lower surface, and so forth). A side to which a medium is fed (+Y side) is referred to as "downstream side", and a side (−Y side) opposite to the downstream side is referred to as "upstream side".

Overview of Scanner

The scanner 1 according to the present disclosure is described below with reference to FIGS. 1 to 3.

Figure 1:
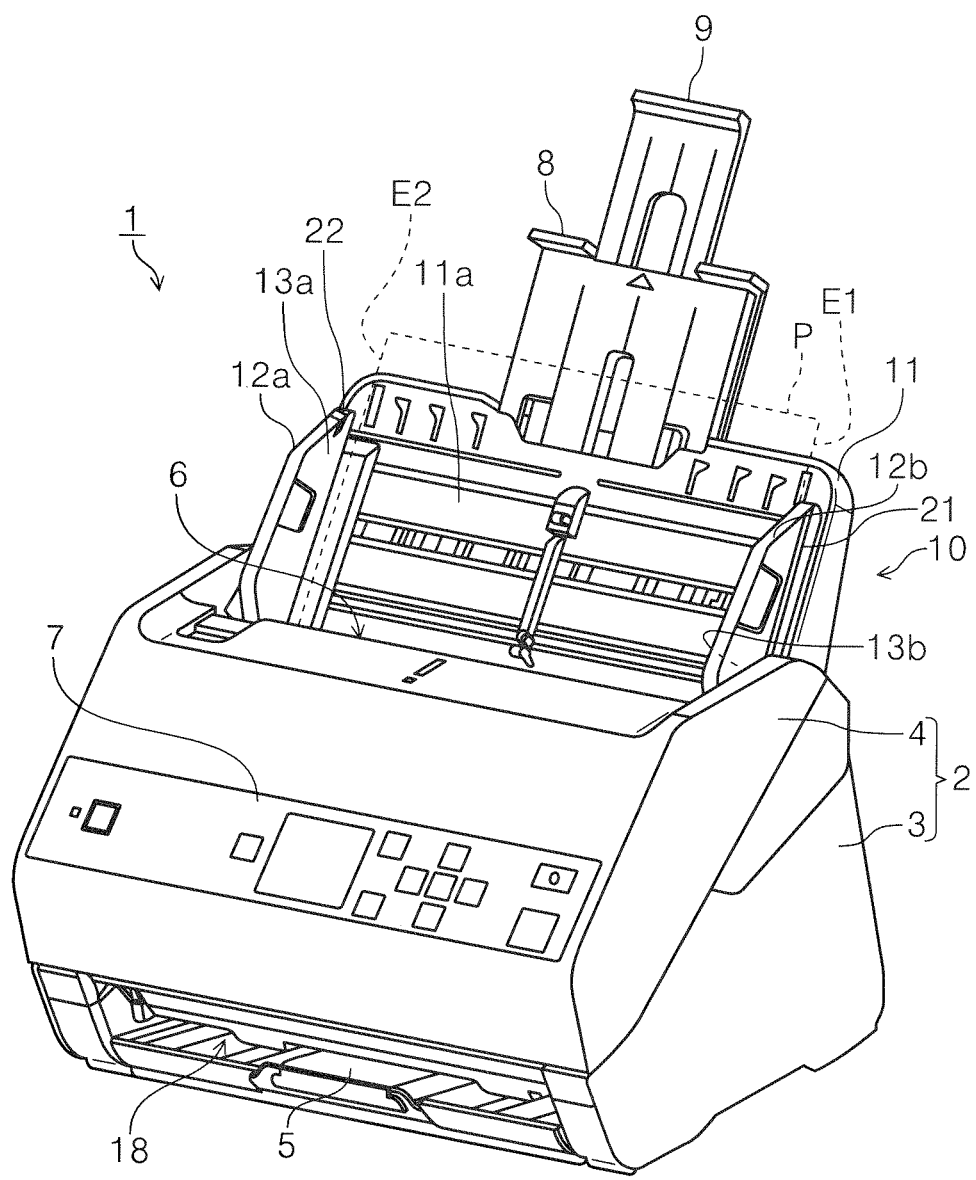
FIG. 1 is an external perspective view showing a scanner according to a first embodiment.
Figure 2:
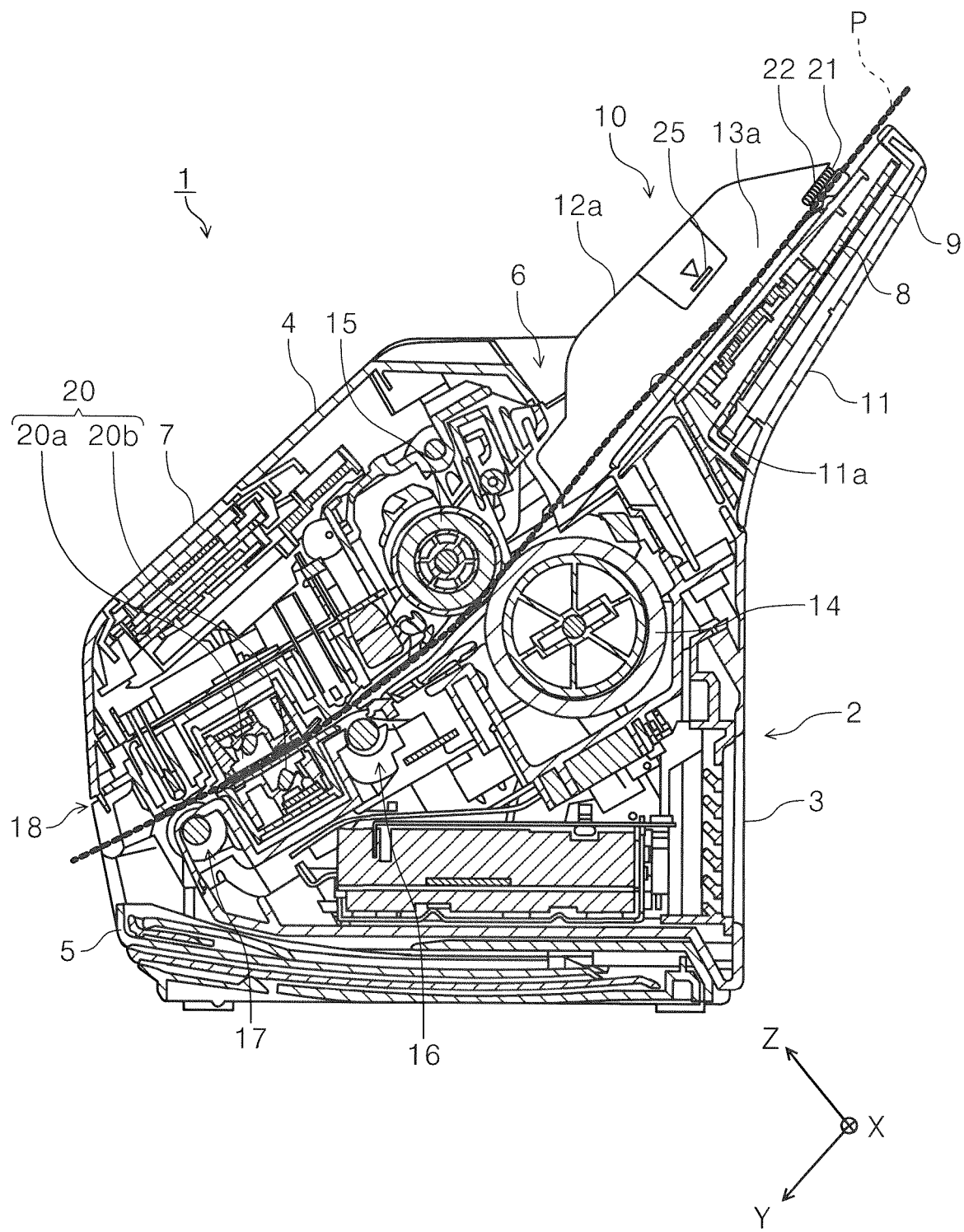
FIG. 2 is a side sectional view illustrating a medium transport path in the scanner according to the first embodiment.

The scanner 1 illustrated in FIG. 1 includes a casing 2 including therein a reading unit 20 (FIG. 2) that reads an image on a medium P and a medium feed device 10 that feeds a medium toward the reading unit 20.

The casing 2 includes a lower unit 3 and an upper unit 4. The upper unit 4 is attached to the lower unit 3 to be openable and closable about the downstream side in the medium transport direction as the pivot. The upper unit 4 pivots to the apparatus front-surface side to be open, a medium transport path of a medium P (indicated by a dotted line in FIG. 2) is exposed, and hence a paper jam of the medium P can be easily cleared.

Figure 3:
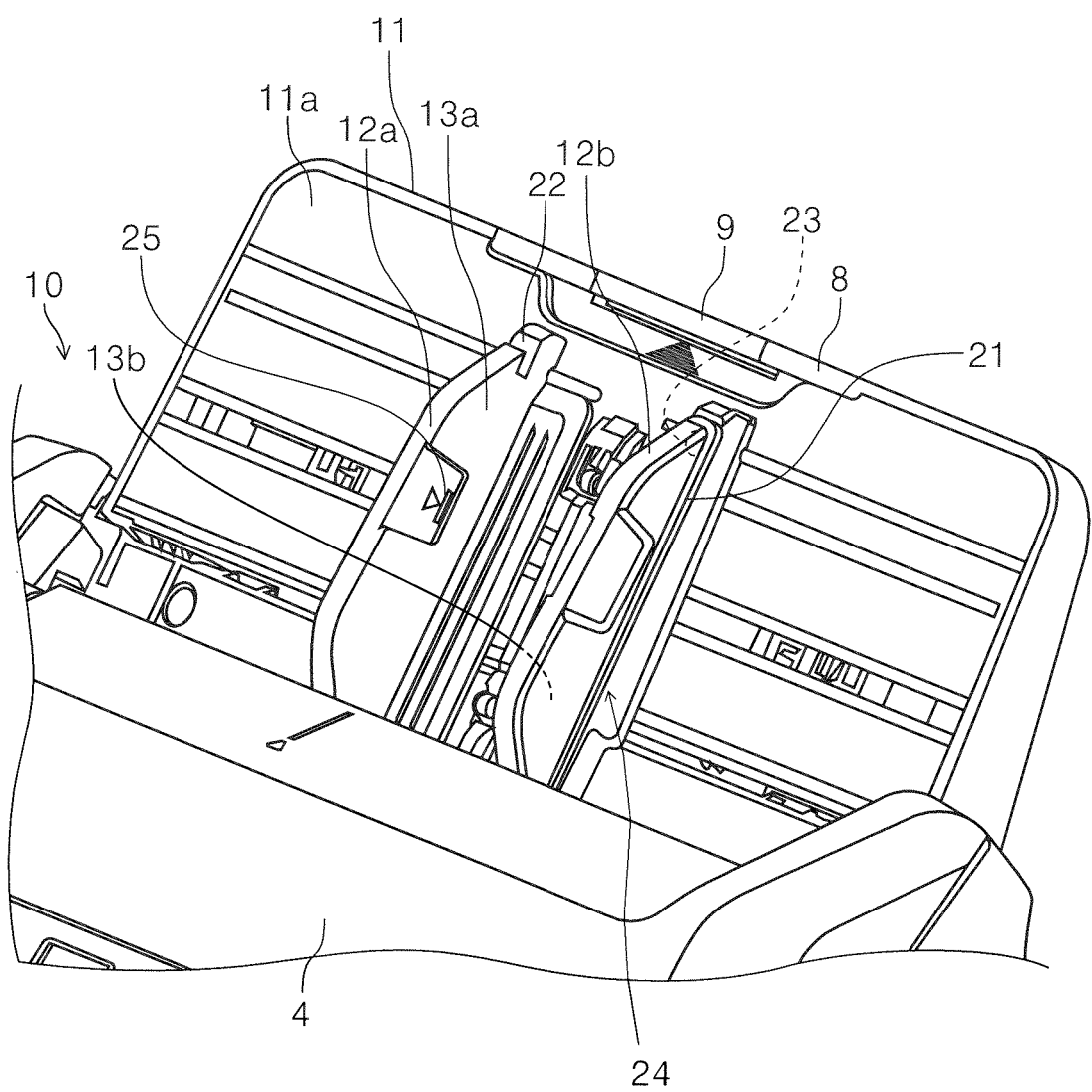
FIG. 3 illustrates a second state in which a restriction part is housed in a first edge guide in a medium feed device according to the first embodiment.

In FIG. 1, a medium placement part 11, a first edge guide 12b and a second edge guide 12a, and a restriction part 21 that constitute the medium feed device 10 are provided on the apparatus rear-surface side (−Y side) of the casing 2 (also see FIG. 3).

The medium placement part 11 includes a placement surface 11a on which a medium P to be fed is placed. The medium placement part 11 is removably attached to the casing 2.

A pair of the first edge guide 12b and the second edge guide 12a are provided at the medium placement part 11, and include a guide surface 13b and a guide surface 13a that guide edges in the width direction (X-axis direction) of the medium P, the width direction intersecting with the feed direction of the medium P (Y-axis direction). The first edge guide 12b forms the guide surface 13b, and the second edge guide 12a forms the guide surface 13a.

A sign 25 is provided on the guide surface 13a of the second edge guide 12a, and indicates the upper limit position when media P are placed by the maximum stack number of media P on the medium placement part 11. Although not illustrated in FIG. 1, a similar sign 25 is also provided on the guide surface 13b of the first edge guide 12b.

The first edge guide 12b and the second edge guide 12a are provided slidably in the X-axis direction in accordance with the size of the medium P. In this embodiment, the first edge guide 12b and the second edge guide 12a are configured such that, when one edge guide (for example, the first edge guide 12b) is moved by a known rack-and-pinion mechanism to one side in the X-axis direction, the other edge guide (the second edge guide 12a) is moved to the other side in the X-axis direction by following the X-axis movement of the one edge guide.

Thus, media P placed on the medium placement part 11 are aligned at the center in the width direction.

FIG. 1 illustrates a state in which the edge guides 12 are located at positions on the outermost sides. FIG. 3 illustrates a state in which the edge guides 12 are located at positions on the innermost sides.

The restriction part 21 that is a feature part of the present disclosure will be described later in detail.

The medium placement part 11 illustrated in FIGS. 1 and 3 includes a first auxiliary paper support 8 and a second auxiliary paper support 9. The first auxiliary paper support 8 and the second auxiliary paper support 9 are configured to be housed in the medium placement part 11 as illustrated in FIG. 3, and pulled out from the medium placement part 11 as illustrated in FIG. 1. The length of the placement surface 11*a* is adjustable.

The casing 2 illustrated in FIG. 1 includes an operation panel 7 on the apparatus front-surface side (+Y side) of the upper unit 4 for various reading settings, operation to execute reading, indication of the contents of the reading settings, and so forth.

A feed port 6 continuous to the inside of the casing 2 is provided at an upper section of the upper unit 4. A medium P placed on the medium placement part 11 is fed through the feed port 6 toward the reading unit 20 (FIG. 2).

In addition, an output tray 5 (described later) is provided on the apparatus front-surface side of the lower unit 3.

Medium Transport Path in Scanner

The medium transport path in the scanner 1 is described next with reference to FIG. 2. The dotted line denoted by reference sign P in FIG. 2 indicates a medium P that is transported along the medium transport path.

A feed roller 14 and a separation roller 15 are provided downstream the medium placement part 11. The feed roller 14 serves as "a feed unit" that feeds the medium P placed on the placement surface 11*a* of the medium placement part 11 toward the reading unit 20. The separation roller 15 nips and separates the medium P between the separation roller 15 and the feed roller 14.

The medium P placed on the placement surface 11*a* of the medium placement part 11 is picked up by the feed roller 14 provided rotatably relative to the lower unit 3, and is fed to the downstream side (+Y side). More specifically, the feed roller 14 contacts a surface of the medium P facing the placement surface 11*a* and rotates. Hence the feed roller 14 feeds the medium P to the downstream side. When a plurality of media P are set on the medium placement part 11 in the scanner 1, the media P are fed to the downstream side in the order from the medium P on the placement surface 11*a* side.

The feed roller 14 and the separation roller 15 are provided in a center region in the width direction (X-axis direction). The medium P is fed using center feed system.

A transport roller pair 16, the reading unit 20 that reads an image, and an output roller pair 17 are provided downstream of the feed roller 14. The medium P fed to the downstream side by the feed roller 14 is nipped by the transport roller pair 16, and is transported to the reading unit 20 located downstream of the transport roller pair 16.

The reading unit 20 includes an upper reading sensor 20*a* provided on the upper unit 4 side, and a lower reading sensor 20*b* provided on the lower unit 3 side. In this embodiment, the upper reading sensor 20*a* and the lower reading sensor 20*b* are configured as a contact image sensor module (CISM) for example.

After an image on at least one of front and back surfaces of the medium P is read by the reading unit 20, the medium P is nipped by the output roller pair 17 located downstream of the reading unit 20 and fed to the downstream side, and the medium P is output from an output port 18 provided on the apparatus front-surface side of the casing 2.

In this embodiment, the feed roller 14, the transport roller pair 16, and the output roller pair 17 are rotationally driven by at least one drive source (not illustrated) provided in the lower unit 3. The drive source is controlled by a controller (not illustrated), and thus, the drive of the feed roller 14, the transport roller pair 16, and the output roller pair 17 is controlled.

The output tray 5 is provided at the lower unit 3. The output tray 5 is configured to be pulled out from the output port 18 to the apparatus front-surface side. The output tray 5 may be in a state in which the output tray 5 is housed in a bottom section of the lower unit 3 (FIG. 1), and a state in which the output tray 5 is pulled out to the apparatus front-surface side (not illustrated). In the state in which the output tray 5 is pulled out, media P output from the output port 18 can be stacked on the output tray 5.

Restriction Part

The restriction part 21 provided in the medium feed device 10 is described next with reference to FIGS. 3 to 6.

The restriction part 21 illustrated in FIGS. 3 to 6 is configured to be switched between a first state (FIG. 5) and a second state (FIG. 3) which will be described later.

Figure 5:
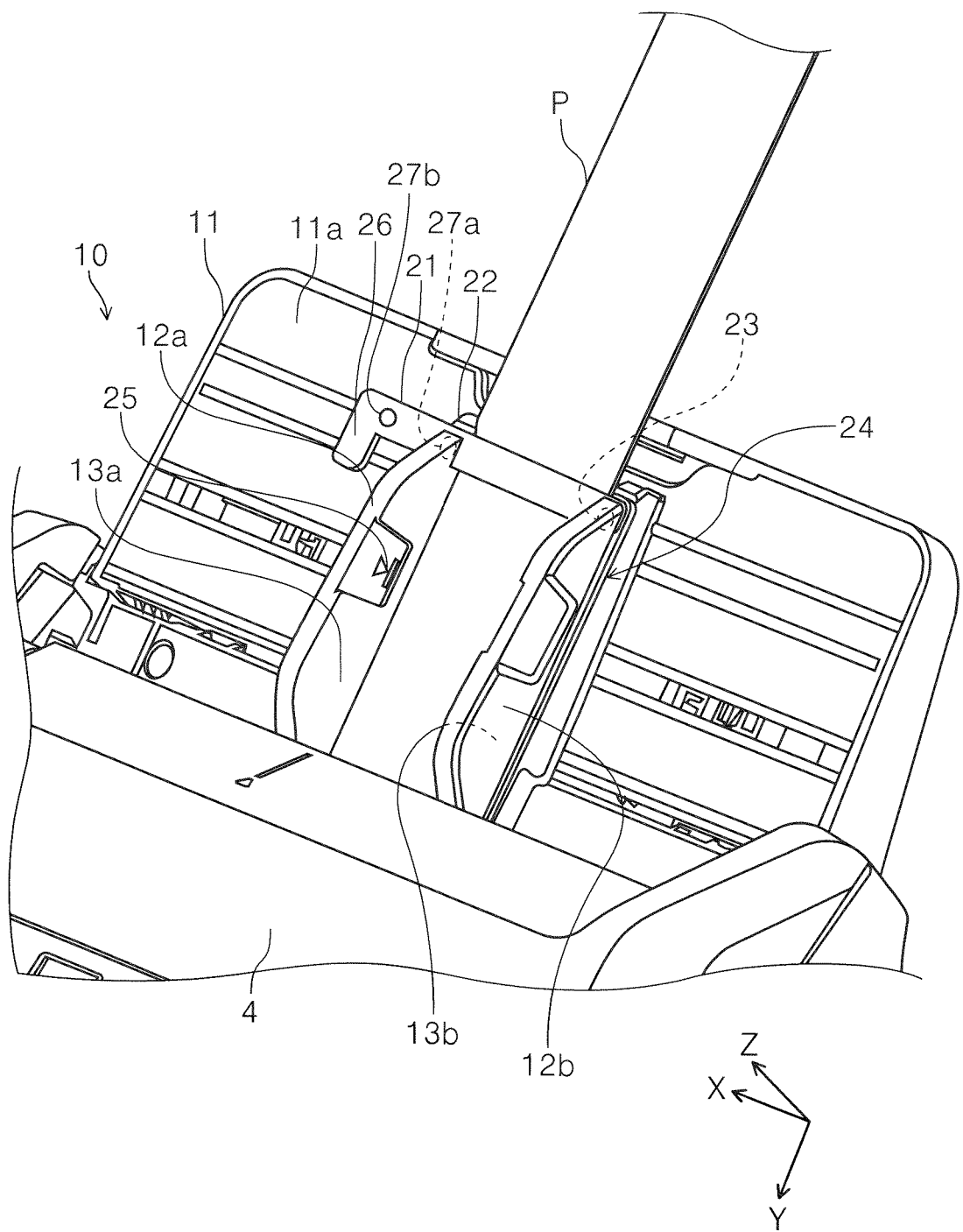
FIG. 5 illustrates the first state of the restriction part in the medium feed device according to the first embodiment.
Figure 6:
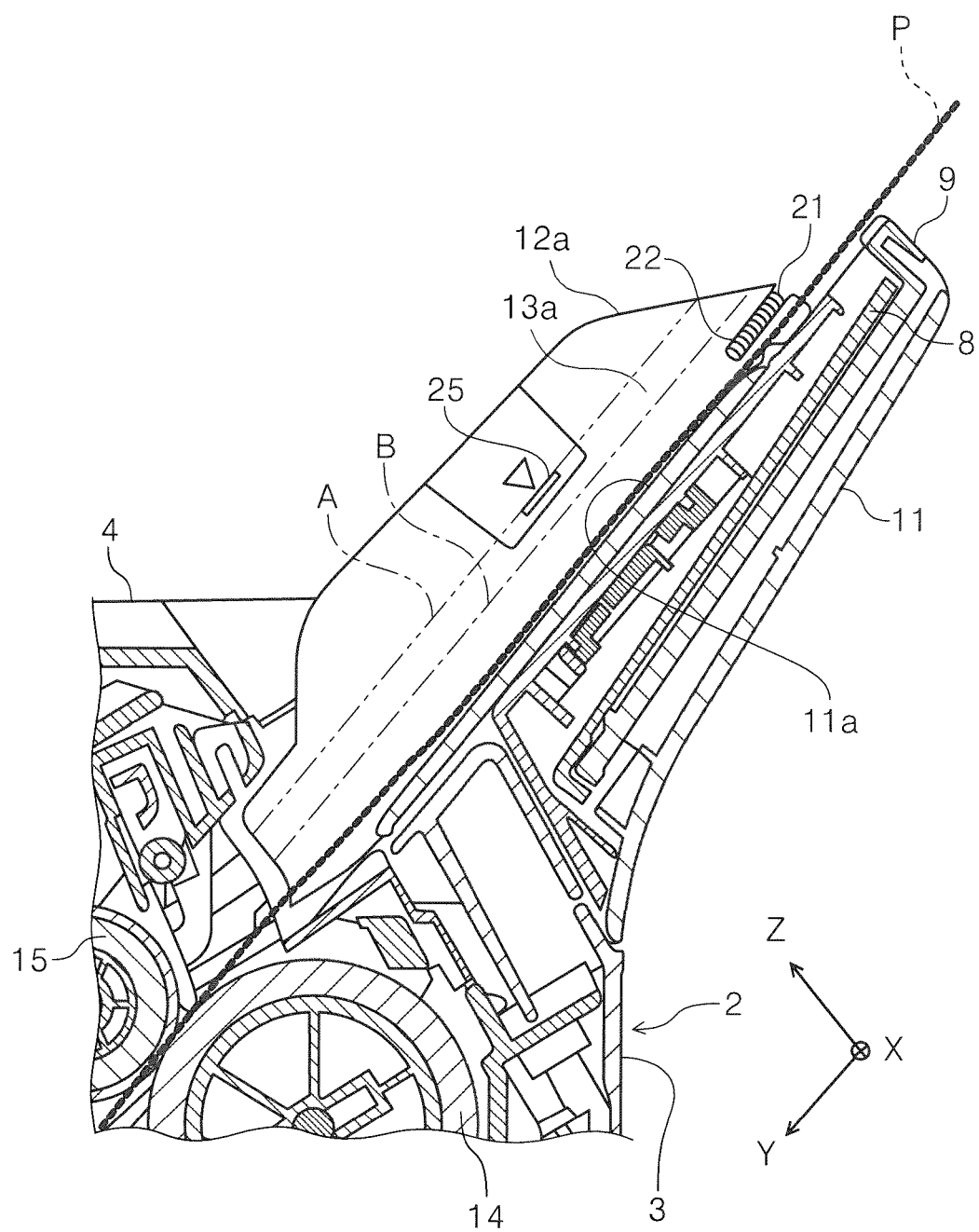
FIG. 6 is a side sectional view of FIG. 5.

In the first state, the restriction part 21 extends in the width direction (X-axis direction) between the first edge guide 12*b* and the second edge guide 12*a* as illustrated in FIG. 5; the position of the restriction part 21 in the direction normal to the placement surface 11*a* (+Z side) is located on the placement surface 11*a* side with respect to an intermediate position B (a position indicated by a one-dot chain line in FIG. 6) between upper ends A of the guide surfaces 13*b* and 13*a* (a position indicated by a two-dot chain line in FIG. 6) and the placement surface 11*a* as illustrated in FIG. 6; and the restriction part 21 suppresses a lift of the medium P from the placement surface 11*a*. The guide surfaces 13*b* and 13*a* do not guide media P at a position above the sign 25 in the direction normal to the placement surface 11*a*, and hence the upper ends A of the guide surfaces 13*b* and 13*a* are at a position at which the upper ends A overlap the sign 25.

In the second state, the restriction part 21 is retracted from between the first edge guide 12*b* and the second edge guide 12*a* as illustrated in FIG. 3.

Figure 4:
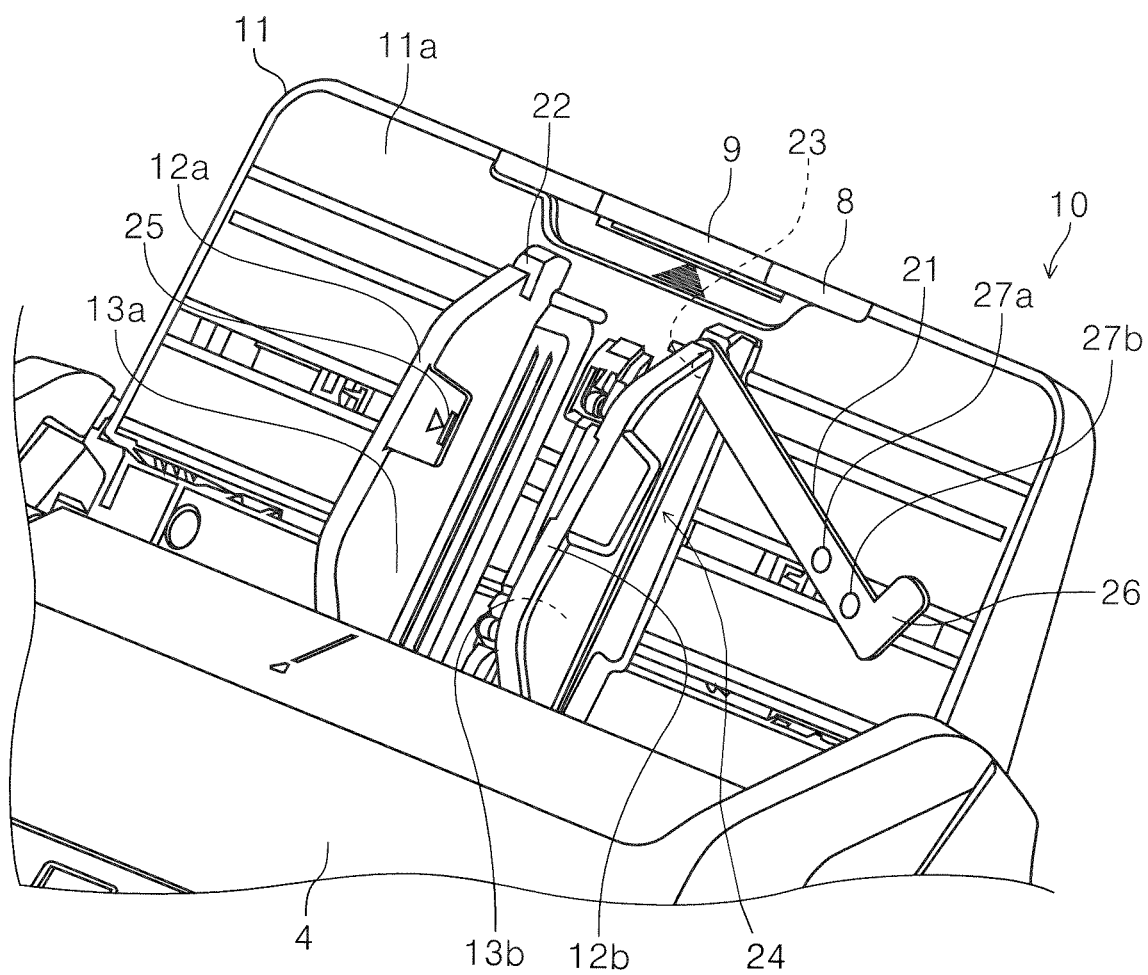
FIG. 4 illustrates a state in the middle of switching when the restriction part is switched between the second state illustrated in FIG. 3 and a first state in the medium feed device according to the first embodiment.
Figure 4:
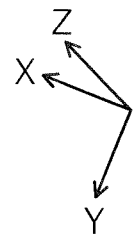

Although described later, FIG. 3 illustrates a state in which the restriction part 21 is housed in a housing portion 24 of the first edge guide 12*b*, and FIG. 4 illustrates a state in the middle of switching between the state in which the restriction part 21 is in the first state (FIG. 5) and the state in which the restriction part 21 is housed in the housing portion 24 (FIG. 3). Since the restriction part 21 is retracted from between the first edge guide 12*b* and the second edge guide 12*a* also in the state in FIG. 4, it can be said that the state in FIG. 4 is the second state. The second state of the restriction part 21 is described below with reference to FIG. 3.

Figure 7:
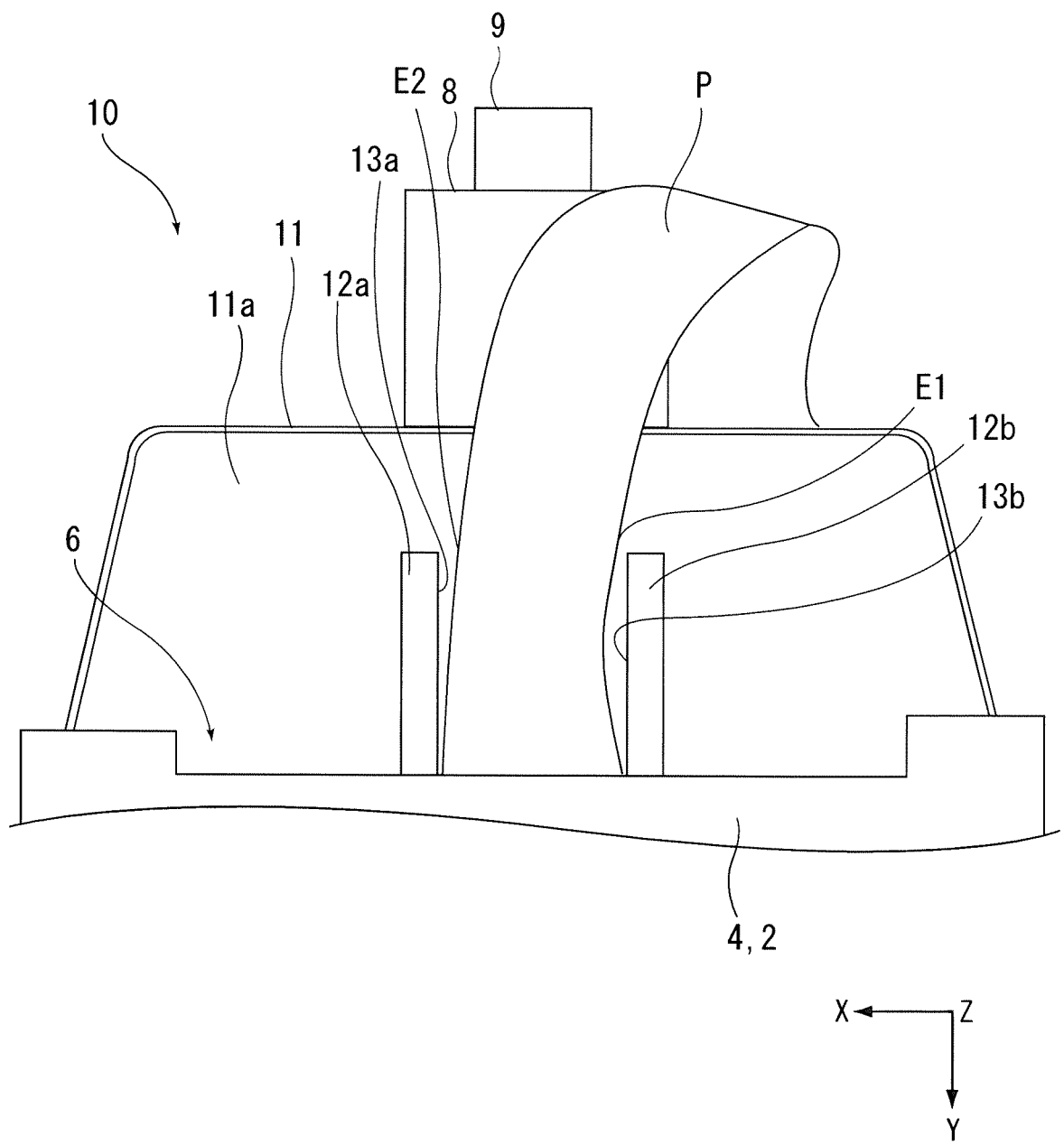
FIG. 7 illustrates a state in which a narrow and long medium is lifted from a placement surface in the medium feed device when the restriction part is in the second state.

With the scanner 1, a narrow and long medium P (FIG. 7), such as a register tape printed by a register, may be read. When the medium feed device 10 feeds a narrow and long medium P, skew is accumulated during feed because the medium P is long, and the medium P may be twisted as illustrated in FIG. 7. In addition, when the long medium P hangs down from the first auxiliary paper support 8 or the second auxiliary paper support 9, the medium P on the placement surface 11*a* may be twisted due to the weight of the hanging medium P.

When the medium P is twisted, as illustrated in FIG. 7, edges E1 and E2 of the medium P may be separated from the guide surfaces 13*b* and 13*a*, and the first edge guide 12*b* and the second edge guide 12*a* no longer provide the guide function. Thus, the skew of the medium P may further increase.

In this case, by bringing the restriction part 21 into the first state (FIG. 5), the restriction part 21 can suppress a lift of the medium P from the placement surface 11a and suppress separation of the edges E1 and E2 of the medium P from the guide surfaces 13b and 13a. Hence, occurrence of skew at the medium P can be suppressed as compared with the case in which the restriction part 21 is in the second state (FIG. 3).

In this embodiment, the restriction part 21 in the first state (FIG. 5) is located at a position close to the placement surface 11a in the direction normal to the placement surface 11a (+Z side) as illustrated in FIG. 6.

In FIG. 6, the distance between the restriction part 21 and the placement surface 11a is a certain distance in which one to several media P can be placed, and is, for example, a distance in a range for several millimeters (2 to 3 mm) for example.

Since the restriction part 21 is located at the position close to the placement surface 11a in the first state (FIG. 5), the restriction part 21 can further reliably press the medium P, and can further effectively suppress occurrence of skew at the medium P.

When the restriction part 21 is in the first state (FIG. 5), only several media P can be placed on the medium placement part 11. However, since the restriction part 21 is configured to be switched between the first state (FIG. 5) and the second state (FIG. 3), in a case where the medium P is a medium that is less likely skewed (for example, a standard-size medium of A4 size, B5 size, etc.; or normal paper or thick paper in terms of medium type) as compared with a narrow and long medium such as a register tape, the restriction part 21 is brought into the second state (FIG. 3). Thus, the maximum stack number of media P on the medium placement part 11 can be larger than that when the restriction part 21 is in the first state (FIG. 5). When the restriction part 21 is in the second state (FIG. 3), media P can be placed by the maximum stack number on the medium placement part 11 (up to the position of the upper ends A in FIG. 6).

In addition, when the restriction part 21 is switched to the first state as illustrated in FIG. 5, the free-end side of the restriction part 21 reaches the second edge guide 12a. The second edge guide 12a includes a receiving portion 22 (FIG. 4) that receives the free-end side of the restriction part 21.

Accordingly, since the restriction part 21 presses the medium P entirely in the width direction, the medium P can be more reliably prevented from being skewed.

The restriction part 21 is substantially parallel to the placement surface 11a when the free-end side is engaged with the receiving portion 22.

Switching Configuration Between First State and Second State of Restriction Part The switching between the first state and the second state of the restriction part 21 can be provided using, for example, the following configuration.

That is, the restriction part 21 is switched between the first state (FIG. 5) and the second state (FIG. 3) when the restriction part 21 pivots on, as an axis, a pivot shaft 23 provided at the first edge guide 12b.

In addition, when the restriction part 21 is switched to the second state (FIG. 3), the restriction part 21 is housed in the housing portion 24 provided at the first edge guide 12b.

The housing portion 24 (FIG. 4) is provided in a surface on the −X side (a surface opposite to the guide surface 13b) of the first edge guide 12b and has a slit shape. The housing portion 24 is accommodated within the thickness in the width direction of the first edge guide 12b (X-axis direction).

With the configuration, when the restriction part 21 is not required to press media, the restriction part 21 can be housed in the housing portion 24.

Other Configuration of Restriction Unit

The second edge guide 12a includes the receiving portion 22 (FIG. 4) that receives the free-end side of the restriction part 21. The restriction part 21 includes positioning portions 27a and 27b (FIGS. 4 and 5) that set the distance between the second edge guide 12a and the first edge guide 12b to predetermined distances when the free-end side is received by the receiving portion 22.

The positioning portions 27a and 27b may use a configuration that can easily switch the state between a fixed state and a released state, for example, a latch structure or a snap-fit structure.

A register tape that is an example of a narrow and long medium P includes, as stand sizes, a 50-mm-wide medium and an 80-mm-wide medium. In this embodiment, the positioning portion 27a positions the distance between the second edge guide 12a and the first edge guide 12b at a distance corresponding to the 50-mm-wide register tape, and the positioning portion 27b positions the distance between the second edge guide 12a and the first edge guide 12b at a distance corresponding to the 80-mm-wide register tape.

Since the restriction part 21 includes the positioning portions 27a and 27b, the distance between the second edge guide 12a and the first edge guide 12b can be set to the predetermined distances.

In addition, the free end of the restriction part 21 is formed in an L-like shape and hence a contact portion 26 is formed. The contact portion 26 is a component portion that restricts movement of the second edge guide 12a to the +X side such that the distance between the second edge guide 12a and the first edge guide 12b does not become larger than the distance corresponding to the width of 80 mm.

The medium feed device 10 according to the above-described first embodiment can be summarized as follows.

A medium feed device 10 illustrated in FIGS. 3 to 6 includes a medium placement part 11 including a placement surface 11a configured to have placed thereon a medium P to be fed; a pair of a first edge guide 12b and a second edge guide 12a that are provided at the medium placement part 11 and that include guide surfaces 13b and 13a that guide edges E in a width direction (X-axis direction) of the medium P, the width direction intersecting with a feed direction (+Y side) of the medium P; and a restriction part 21 that is configured to be switched between a first state (FIG. 5) and a second state (FIG. 3). In the first state, the restriction part 21 extends in the width direction between the first edge guide 12b and the second edge guide 12a, a position of the restriction part 21 in a direction normal to the placement surface 11a (+Z side) is located on a placement surface 11a side with respect to an intermediate position B (FIG. 6) between upper ends A (FIG. 6) of the guide surfaces 13b and 13a and the placement surface 11a, and the restriction part 21 suppresses a lift of the medium P from the placement surface 11a. In the second state, the restriction part 21 is retracted from between the first edge guide 12b and the second edge guide 12a.

In another point of view, a medium feed device 10 includes a medium placement part 11 including a placement surface 11a configured to have placed thereon a medium P to be fed; a pair of a first edge guide 12b and a second edge guide 12a that are provided at the medium placement part 11 and that include guide surfaces 13b and 13a that guide edges E in a width direction (X-axis direction) of the medium P, the width direction intersecting with a feed direction (+Y side) of the medium P; and a restriction part 21 that is configured to be switched between a first state (FIG. 5) and a second state (FIG. 3). In the first state, the restriction part 21 extends in the width direction between the first edge guide 12b and the second edge guide 12a, a position of the restriction part 21 in a direction normal to the placement surface 11a (+Z side) is a position at which the restriction part 21 suppresses a lift of the medium P from the placement surface 11a and is a position at which the restriction part 21 suppresses separation (a state in FIG. 7) of the edges E of the medium P from the guide surfaces 13b and 13a. In the second state, the restriction part 21 is retracted from between the first edge guide 12b and the second edge guide 12a.

Since the medium feed device 10 includes the restriction part 21, by bringing the restriction part 21 into the first state (FIG. 5), the restriction part 21 presses a medium P that is likely lifted from the placement surface 11a, and occurrence of skew at the medium P can be restricted.

When the medium P is less likely lifted and the restriction part 21 does not have to press the medium, by bringing the restriction part 21 into the second state (FIG. 3), the maximum stack number of media P on the medium placement part 11 can be larger than that when the restriction part 21 is in the first state (FIG. 5).

Modification 1 of Embodiment

Figure 8:
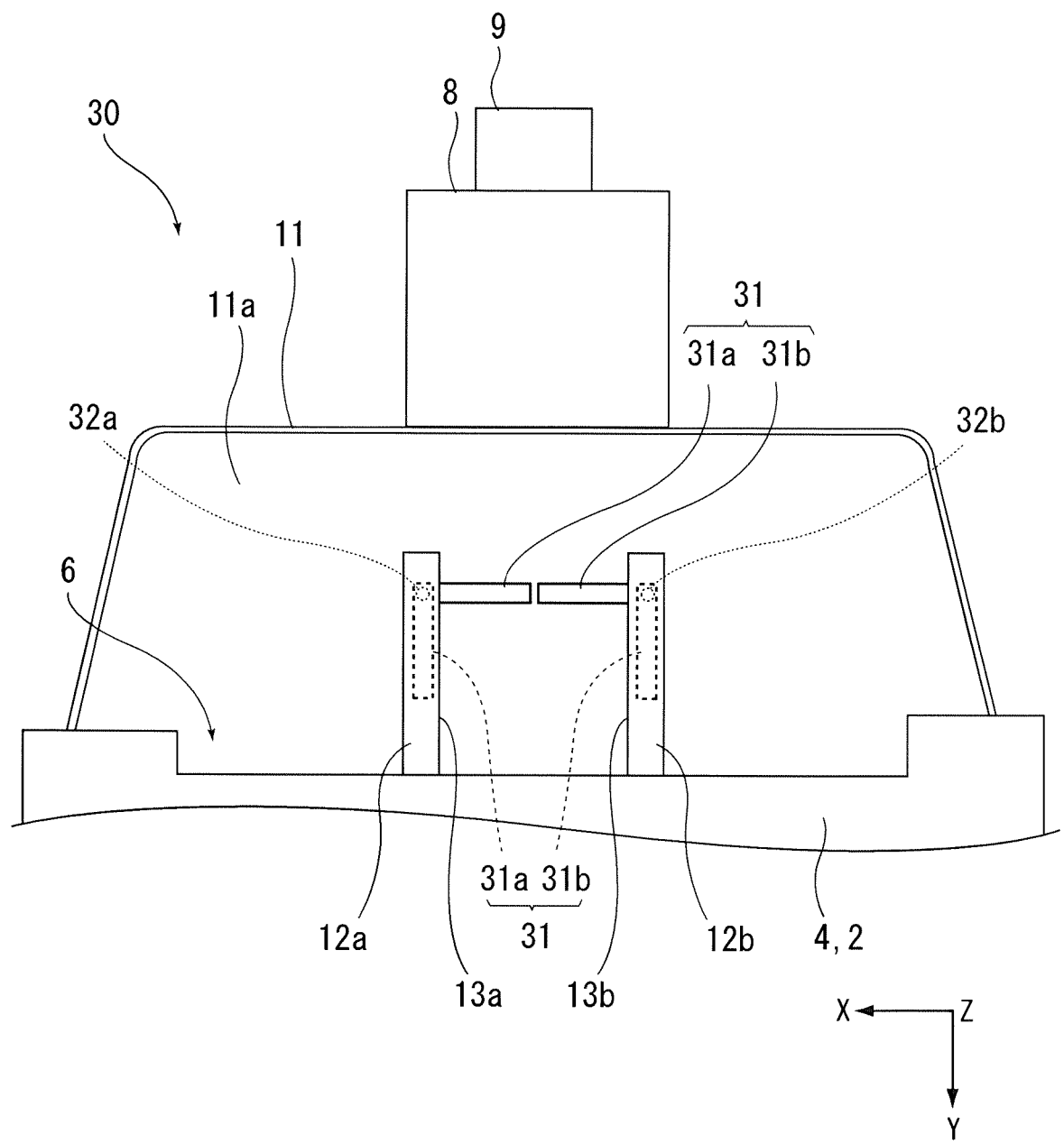
FIG. 8 is an illustration explaining a modification of the restriction part.
Figure 9:
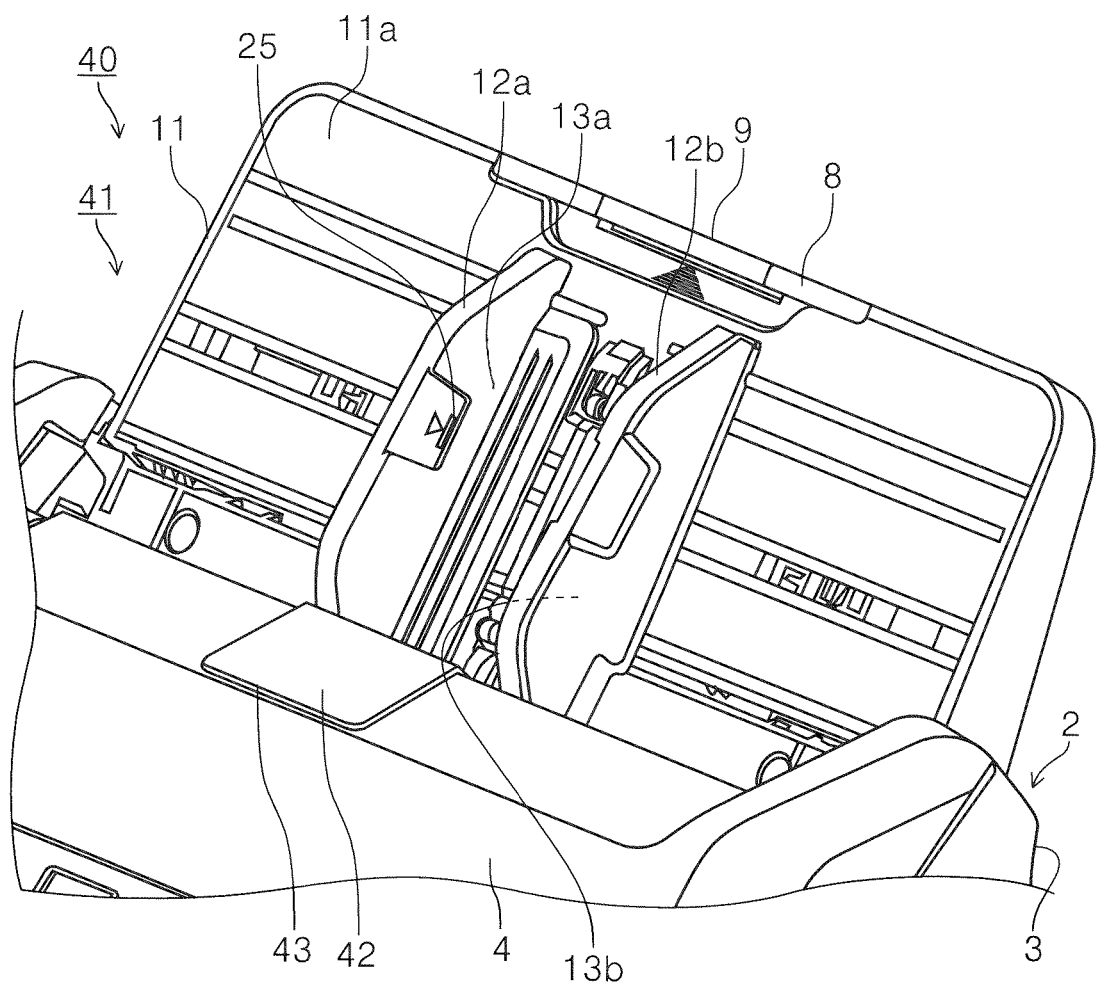
FIG. 9 illustrates a second state of a restriction part in a medium feed device according to a second embodiment.

FIG. 8 illustrates a medium feed device 30 that is a modification of the first embodiment. In the medium feed device 30, a restriction part 31 includes two restriction portions 31a and 31b that are shorter than the restriction part 21 of the first embodiment.

The restriction portion 31a has a pivot shaft 32a at the second edge guide 12a and is configured to be housed in the second edge guide 12a. The restriction portion 31b has a pivot shaft 32b at the first edge guide 12b and is configured to be housed in the first edge guide 12b.

In FIG. 8, the restriction portion 31a and the restriction portion 31b indicated by solid lines are in the first state, and the restriction portion 31a and the restriction portion 31b indicated by dotted lines are in the second state stored in the second edge guide 12a and the first edge guide 12b.

With this configuration, a lift of a medium P can be suppressed substantially in the entire region in the width direction.

In the first state, the restriction portion 31a and the restriction portion 31b are arranged substantially in parallel to the placement surface 11a. However, free ends of the restriction portion 31a and the restriction portion 31b may contact the placement surface 11a in the first state like a restriction part 42 according to a second embodiment (described later). Thus, a center region of a medium P can be reliably pressed, and a lift of the medium P from the placement surface 11a can be effectively suppressed.

Second Embodiment

In the second embodiment, another example of the restriction part is described with reference to FIGS. 9 to 12.

In this embodiment, the same reference sign is applied to the same configuration of the first embodiment, and the description on the configuration is omitted.

Figure 11:
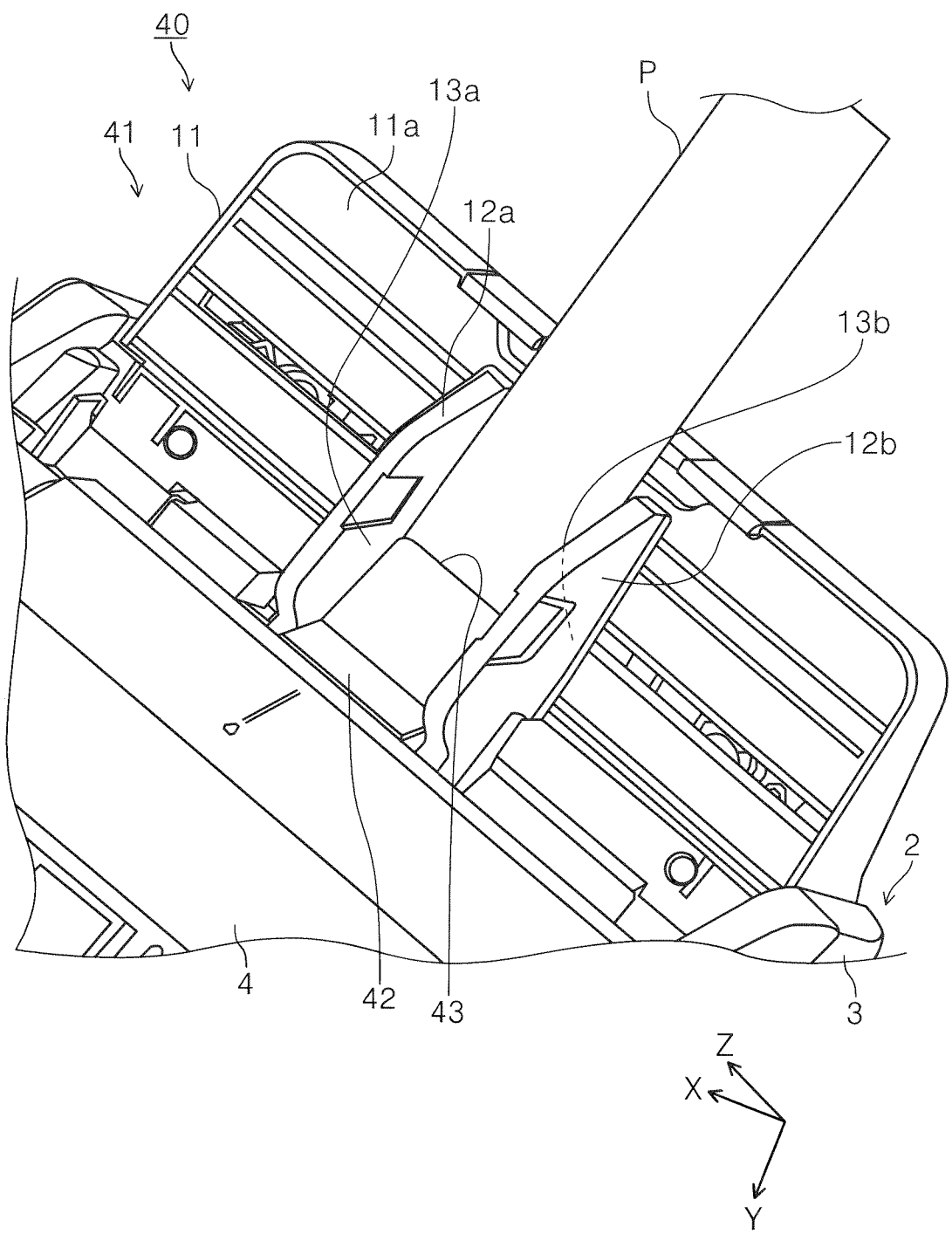
FIG. 11 illustrates the first state of the restriction part in the medium feed device according to the second embodiment.
Figure 12:
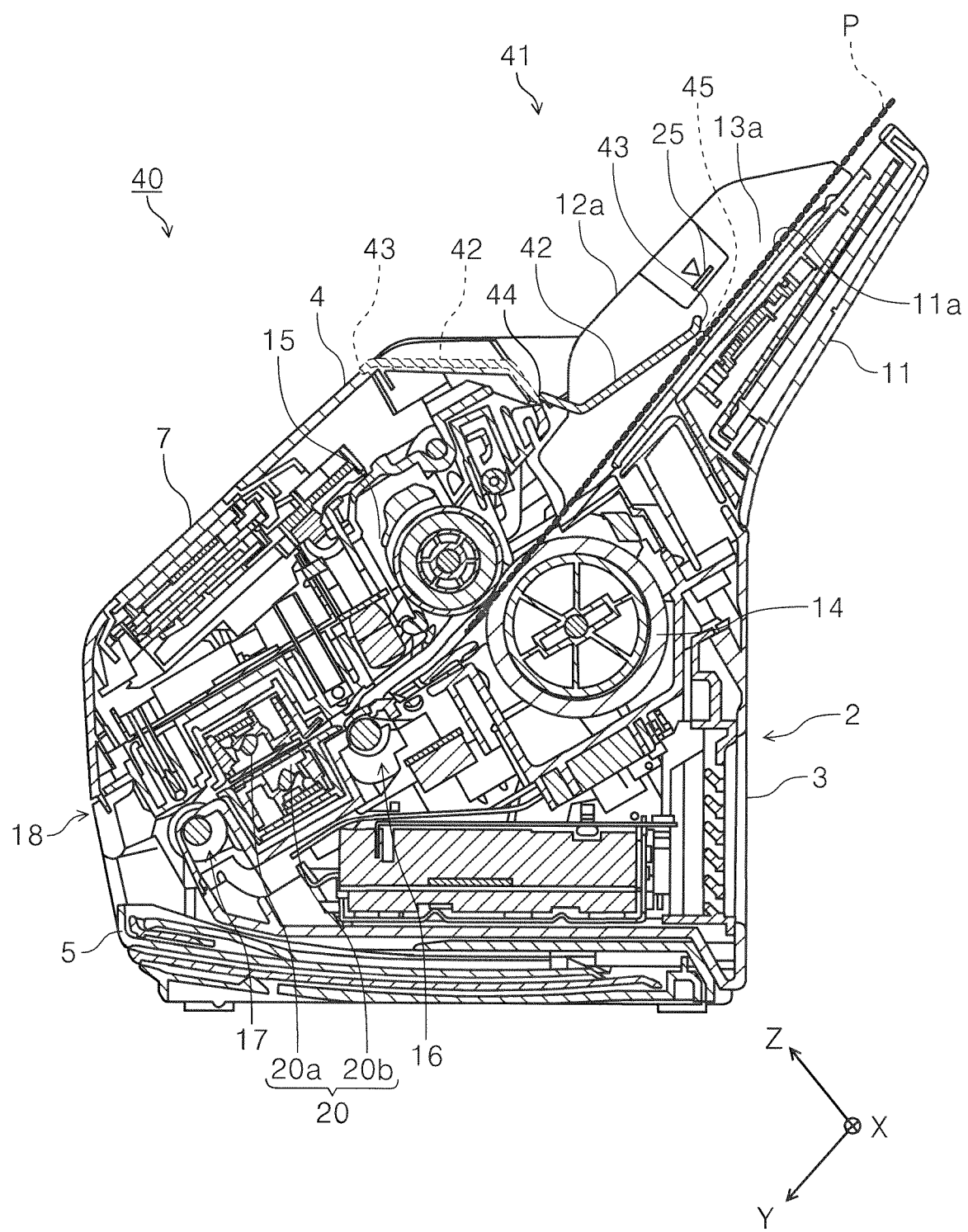
FIG. 12 is a side sectional view of a scanner according to the second embodiment.

In a medium feed device 41 provided at a document scanner 40 according to the second embodiment, when a restriction part 42 is in a first state without a medium P on the placement surface 11a (in a state of the restriction part 42 indicated by solid lines in FIG. 12), the restriction part 42 contacts the placement surface 11a. FIG. 11 illustrates the first state with a medium P.

That is, a medium feed device 41 includes a medium placement part 11 including a placement surface 11a configured to have placed thereon a medium P to be fed; a pair of a first edge guide 12b and a second edge guide 12a that are provided at the medium placement part 11 and that include guide surfaces 13b and 13a that guide edges in a width direction (X-axis direction) of the medium P, the width direction intersecting with a feed direction (+Y side) of the medium P; and a restriction part 42 that is configured to be switched between a first state and a second state. In the first state, the restriction part 42 presses the medium P to the placement surface 11a between the first edge guide 12b and the second edge guide 12a. In the second state, the restriction part 42 is separated from the medium P on the placement surface 11a, and that suppresses a lift of the medium P from the placement surface 11a in the first state.

The pressing force of the restriction part 42 to the placement surface 11a for the medium P in the first state can act, for example, using the weight of the restriction part 42. In addition to the pressing force using the weight of the restriction part 42, a pressure force can act using a pressure force of a pressing member such as a spring.

By bringing the restriction part 42 into the first state, the restriction part 42 directly presses the medium P, and hence can further reliably suppress a lift of the medium P. Thus, occurrence of skew at the medium P can be suppressed as compared with the case where the restriction part 42 is in the second state.

In this embodiment, the restriction part 42 is switched between the first state (the restriction part 42 illustrated in FIG. 11 and indicated by solid lines in FIG. 12) and the second state (the restriction part 42 illustrated in FIG. 9 and indicated by dotted lines in FIG. 12) when the restriction part 42 pivots on, as an axis, a pivot shaft 44 (FIG. 12) provided at the casing 2 having arranged therein the feed roller 14 (feed unit) that feeds the medium P.

With this simple configuration, the restriction part 42 can be switched between the first state and the second state.

Figure 10:
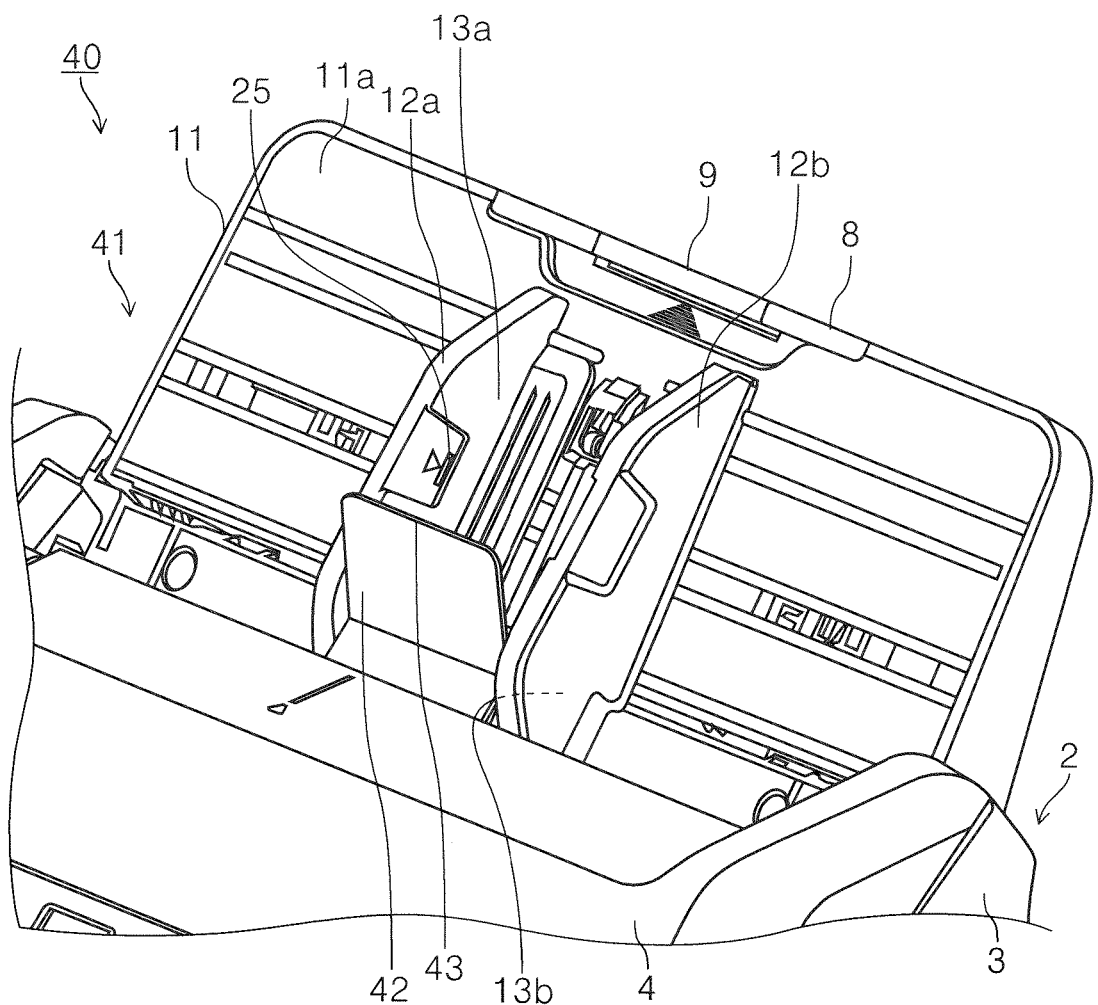
FIG. 10 illustrates a state in the middle of switching when the restriction part is switched between the second state illustrated in FIG. 9 and a first state in the medium feed device according to the second embodiment.

In this embodiment, the pivot shaft 44 is provided at a section located above the feed port 6 in the upper unit 4 that constitutes the casing 2. FIG. 10 illustrates a state in the middle of switching between the second state illustrated in FIG. 9 and the first state illustrated in FIG. 11.

Similarly to the first embodiment, when a medium P that is less likely skewed is to be fed, the restriction part 42 is brought into the second state, and hence the maximum stack number of media on the medium placement part 11 can be larger than that when the restriction part 42 is in the first state.

In this embodiment, the length of the restriction part 42 in the width direction (X-axis direction) is set to a length corresponding to a 50-mm-wide register tape. Thus, as illustrated in FIG. 11, when the distance between the second edge guide 12a and the first edge guide 12b is set to the distance for guiding the 50-mm-wide register tape (a medium P in FIG. 11), the restriction part 42 can press substantially the entire region in the width direction of the medium P.

When the distance between the second edge guide 12a and the first edge guide 12b is set to the distance for guiding an 80-mm-wide register tape (a medium P in FIG. 11), the restriction part 42 does not press both end portions in the width direction of the medium P; however, can press a center region in the width direction of the medium P.

That is, the restriction part 42 suppresses a lift of at least the center region in the width direction of the medium P from the placement surface 11a when the restriction part 42 is switched to the first state.

In the first state, since the restriction part 42 presses the center region in the width direction of the medium P and suppresses a lift of the medium P from the placement surface 11a, the restriction part 42 can effectively suppress a lift of the medium P from the placement surface 11a.

It is desirable that the restriction part 42 presses a medium P by a half or more of the length of the medium P in the width direction.

The restriction part 42 can include a rotary body 45 (indicated by dotted lines in FIG. 12) such as a roller that rotates in the feed direction, at a contact portion 43 of the restriction part 42 with respect to a medium P.

Since the restriction part 42 includes the rotary body 45 at the contact portion 43 thereof, transport resistance that is generated when the restriction part 42 presses the medium P can be reduced.

Other Modifications of Embodiments

In any of the first and second embodiments, the medium feed device 10, 30, 41 is applied to the scanner as an example of the image reading apparatus. However, instead of this configuration, the medium feed device 10, 30, 41 may be applied to, for example, a printer.

The present disclosure is not limited to the above-described embodiments, and can be modified in various ways within the scope of the disclosure written in the claims. In a matter of course, the modifications are included in the scope of the disclosure.

What is claimed is:

1. A medium feed device comprising:
a medium placement part including a placement surface configured to have placed thereon a medium to be fed;
a pair of a first edge guide and a second edge guide that are provided at the medium placement part and that include guide surfaces that guide edges in a width direction of the medium, the width direction intersecting with a feed direction of the medium; and
a restriction part configured to take a first position between the first edge guide and the second edge guide such that a position of the restriction part in a direction normal to the placement surface is a position at which the restriction part suppresses a lift of the medium from the placement surface and a position at which the restriction part suppresses separation of the edges of the medium from the guide surfaces, wherein
the position of the restriction part at which the restriction part suppresses the lift at the first position is located on a placement surface side with respect to an intermediate position between upper ends of the guide surfaces and the placement surface,
wherein the restriction part is configured to be switched between the first position and a second position at which the restriction part is retracted from between the first edge guide and the second edge guide, the restriction part is switched between the first position and the second position when the restriction part pivots on, as an axis, a pivot shaft provided at the first edge guide, and
a free-end side of the restriction part reaches the second edge guide when the restriction part is switched to the first position.

2. The medium feed device according to claim 1, wherein the restriction part suppresses a lift of at least a center region in the width direction of the medium from the placement surface when the restriction part is switched to the first position.

3. The medium feed device according to claim 1, wherein the second edge guide includes a receiving portion that receives the free-end side of the restriction part, and
the restriction part includes a positioning portion that sets a distance between the second edge guide and the first edge guide to a predetermined distance when the free-end side is received by the receiving portion.

4. The medium feed device according to claim 1, wherein the restriction part is housed in a housing portion provided in the first edge guide when the restriction part is switched to the second position.

5. An image reading apparatus comprising:
a reading unit that reads an image on the medium; and
the medium feed device according to claim 1 that feeds the medium toward the reading unit.

6. A medium feed device comprising:
a medium placement part including a placement surface configured to have placed thereon a medium to be fed;
a pair of a first edge guide and a second edge guide that are provided at the medium placement part and that include guide surfaces that guide edges in a width direction of the medium, the width direction intersecting with a feed direction of the medium; and
a restriction part configured to be switched between a first position and a second position, the restriction part at the first position being configured to suppress a lift of the medium from the placement surface, the restriction part at the second position being retracted from between the first edge guide and the second edge guide,
wherein the restriction part is switched between the first position and the second position when the restriction part pivots on, as an axis, a pivot shaft provided at the first edge guide,
a free-end side of the restriction part reaches the second edge guide when the restriction part is switched to the first position,
wherein the second edge guide includes a receiving portion that receives the free-end side of the restriction part, and
the restriction part includes a positioning portion that sets a distance between the second edge guide and the first edge guide to a predetermined distance when the free-end side is received by the receiving portion.

7. An image reading apparatus comprising:
a reading unit that reads an image on the medium; and
the medium feed device according to claim 6 that feeds the medium toward the reading unit.

* * * * *